(12) United States Patent
Lee et al.

(10) Patent No.: US 8,772,411 B2
(45) Date of Patent: Jul. 8, 2014

(54) PREPARATION OF POLYOLEFIN-BASED ADHESIVES

(75) Inventors: Chun D. Lee, Cincinnati, OH (US); Charles S. Holland, Springboro, OH (US); Maged G. Botros, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 147 days.

(21) Appl. No.: 12/454,780

(22) Filed: May 22, 2009

(65) Prior Publication Data

US 2010/0298500 A1 Nov. 25, 2010

(51) Int. Cl.
- *C08L 23/00* (2006.01)
- *C08L 23/04* (2006.01)
- *C08L 33/02* (2006.01)

(52) U.S. Cl.
USPC ........ 525/240; 525/191; 525/221; 526/352.2; 428/523

(58) Field of Classification Search
USPC ........................................ 525/240; 526/352.2
See application file for complete search history.

(56) References Cited

U.S. PATENT DOCUMENTS

| | | | |
|---|---|---|---|
| 4,438,238 A * | 3/1984 | Fukushima et al. | 525/240 |
| 4,487,885 A | 12/1984 | Adur et al. | |
| 5,260,384 A * | 11/1993 | Morimoto et al. | 525/240 |
| 6,177,516 B1 | 1/2001 | Hudak | |
| 6,716,928 B2 | 4/2004 | Botros | |
| 6,835,777 B2 * | 12/2004 | Botros | 525/69 |
| 6,838,520 B2 | 1/2005 | Etherton | |
| 2006/0076705 A1 | 4/2006 | Fowler et al. | |

FOREIGN PATENT DOCUMENTS

| | | |
|---|---|---|
| WO | 2005/113697 | 12/2005 |
| WO | 2008/018949 | 2/2008 |

OTHER PUBLICATIONS

Wallace W. Yau and David Gillespie, *New approaches using MW-sensitive detectors in GPC-TREF for polyolefin characterization*, Polymer 42 (2001) 8947-8958, Elsevier Science Ltd.

* cited by examiner

*Primary Examiner* — Irina Krylova

(57) ABSTRACT

Disclosed is a polyolefin-based adhesive. The adhesive comprises a maleated polyolefin. The maleated polyolefin is let-down in a linear low density polyethylene (LLDPE). The let-down LLDPE is selected from those which have a melt index $MI_2$ within the range of 0.1 dg/min to 5 dg/min, preferably from 1 dg/min to 3 dg/min, and comprises a TREF soluble fraction having an intrinsic viscosity less than 0.9 dl/g. The adhesive composition can be used in multilayer polyolefin films and multilayer pipes.

13 Claims, No Drawings

PREPARATION OF POLYOLEFIN-BASED ADHESIVES

FIELD OF THE INVENTION

The present invention relates to polyolefin-based adhesives. More particularly, the invention relates to polyolefin-based adhesives that have improved adhesion in multilayer polyolefin films and pipes.

BACKGROUND OF THE INVENTION

One application of polyolefin-based adhesives is for multilayer films. Multilayer films are widely used in the packaging industry. Depending on the intended end-use of the film, the number and arrangement of layers as well as the types of polymer resins employed will vary. Polymer resins used include a wide variety of polar and non-polar polymers selected depending on their ability to provide essential properties such as structural integrity, puncture resistance, abrasion resistance, etc. Resins having barrier properties are generally included as a barrier layer to prevent the passage of oxygen and moisture in multilayer constructions used for food packaging. Commonly used resins for barrier layers include polyethylene (PE), ethylene-vinyl acetate (EVA) copolymers, ethylene-vinyl alcohol (EVOH) copolymers, nylons and the like. To facilitate adhesion of layers of dissimilar polymer resins, for instance between a PE layer and an EVOH or nylon layer, adhesive layers referred to as tie layers are employed. The tie layers are generally mixtures of functionalized polyolefins and non-functionalized polyolefins.

Another application of polyolefin-based adhesives is for polymer-metal multilayer pipes. The multilayer pipes are increasingly used for plumbing and heating applications. PE and PEX (cross-linked PE) are commonly used polyolefins; aluminum and copper are commonly used metals. The multilayer pipes usually have the structure of PEX/tie/metal/tie/PEX or PE/tie/metal/tie/PE. Although the metal provides most of the mechanical strength in these constructions, mechanical integrity and pressure ratings of the multilayer pipes depend on the quality of the tie layer between the metal and PE.

Maleated polyolefins are commonly used functionalized polyolefins in tie layer adhesives. Maleating a polyolefin is usually performed by visbreaking, with or without free radical initiator, the polyolefin in the presence of maleic anhydride. The maleated polyolefin is typically let down with non-functionalized polyolefin resins to a desired concentration and to provide a polyolefin-based adhesive. See U.S. Pat. No. 4,487,885. The maleated polyolefin can be let down by a variety of polyolefin resins, including high density polyethylene (HDPE), low density polyethylene (LDPE), linear low density polyethylene (LLDPE), medium density polyethylene (MDPE), polypropylene and ethylene-vinyl acetate copolymers. High performance adhesives also utilize a polyolefin elastomer as a let-down resin.

While many polyolefin-based adhesives are known, new adhesive compositions are always in demand to meet the requirements of new polyolefin laminate applications. Particularly, there is a need for polyolefin-based adhesives which have improved adhesion in multilayer polyolefin films and pipes.

SUMMARY OF THE INVENTION

The invention is a polyolefin-based adhesive composition. The adhesive comprises a maleated polyolefin. The maleated polyolefin is let down by a linear low density polyethylene (LLDPE). The let-down LLDPE is selected from those which have a melt index $MI_2$ (ASTM D-1238) within the range of 0.1 dg/min to 5 dg/min, preferably from 1 dg/min to 3 dg/min, and have a TREF soluble fraction which has an intrinsic viscosity less than 0.9 dl/g. The adhesive composition of the invention has good adhesion in multilayer polyolefin films and multilayer pipes. The invention includes a process for making the polyolefin-based adhesive composition. The process comprises blending the maleated polyolefin and LLDPE; the LLDPE is preferably in the reactor powder form.

DETAILED DESCRIPTION OF THE INVENTION

Suitable maleated polyolefins for use in the adhesive composition of the invention include those known to the industry. Examples of suitable maleated polyolefins include maleated high density polyethylene (HDPE), low density polyethylene (LDPE), linear low density polyethylene (LLDPE), propylene homopolymer, propylene random copolymer, propylene impact copolymer, the like, and mixtures thereof. Methods for maleating polyolefin are known. For instance, U.S. Pat. No. 6,716,928, the teachings of which are incorporated herein by reference, teaches maleating a propylene impact copolymer.

Preferably, the maleated polyolefin is a maleated HDPE. Suitable HDPE for making maleated HDPE includes ethylene homopolymers and copolymers of ethylene and α-olefins. Suitable α-olefins include 1-butene, 1-hexene, 1-octene, 4-methyl pentene-1, the like, and mixtures thereof. Preferably, the HDPE comprises less than 5 wt % of α-olefins. The density of HDPE is preferably within the range of 0.93 to 0.97 $g/cm^3$ and more preferably within the range of 0.95 to 0.965 $g/cm^3$. Preferably, the maleated HDPE contains from 0.05 wt % to 5 wt % of grafted maleic anhydride. More preferably, the maleated HDPE contains from 0.5 wt % to 3.5 wt % of grafted maleic anhydride.

Maleating polyolefin can be accomplished in accordance with any known procedures, preferably by heating a mixture of the polyolefin and maleic anhydride with or without a solvent. More preferably, the maleated polyolefin is prepared by melt-grafting maleic anhydride on the polyolefin in the substantial absence of a solvent, with or without a free radical initiator, such as organic peroxides and azo compounds, in a shear-imparting reactor such as an extruder. Twin screw extruders such as those marketed by Werner-Pfleiderer under the designations ZSK-53, ZSK-83, ZSK-90 and ZSK-92 are especially useful for carrying out the maleating operation.

The maleated polyolefin is let down in an LLDPE. Suitable LLDPE has a melt index $MI_2$ (ASTM D-1238) within the range of 0.1 dg/min to 5 dg/min, preferably within the range of 0.5 dg/min to 3 dg/min, and more preferably within the range of 1 dg/min to 2 dg/min. The LLDPE comprises a TREF soluble fraction which has an intrinsic viscosity less than 0.9 dl/g, preferably less than or equal to 0.8 dl/g, and most preferably less than or equal to 0.7 dl/g as measured by the TREF measurement at 150° C. in ODCB. A particularly preferred range of the intrinsic viscosity is from 0.3 dl/g to 0.7 dl/g. Preferably, the LLDPE comprises greater than 15 wt % of the TREF soluble fraction. More preferably, the LLDPE comprises a TREF soluble fraction within the range of 15 wt % to 20 wt %. The TREF measurement is performed by dissolving the polymer sample in ODCB (ortho-dichlorobenzene) and injecting the solution into a TREF column of an automated 3D-TREF system at 150° C. The flow of ODCB is then switched away from the column when the column is being slowly (it usually takes about 3 hours) cooled to 35° C. The ODCB flow is then re-established through the TREF column, preparing the system for a controlled heating and elution step. As the temperature increases with time during this TREF elution cycle, the more branched molecules elute first, followed by those with decreasing short chain branching (SCB), which is detected by IR detector. The soluble fraction is measured from the peak area of TREF curves below 45° C. The TREF unit is also used to detect the intrinsic viscosity (IV) of the soluble fraction. More detailed description of the TREF method can be found in the following examples and from Wallace W. Yau et al., "New approaches using MW-sensitive detectors in GPC-TREF for polyolefin characterization," *Polymer* 42, (2001) 8947-8958.

Suitable let-down LLDPE includes copolymers of ethylene and α-olefins. Suitable α-olefins include 1-butene, 1-hexene, and 1-octene, the like, and mixtures thereof. The density of let-down LLDPE is preferably within the range of 0.85 g/cm$^3$ to 0.93 g/cm$^3$; more preferably within the range of 0.90 g/cm$^3$ to 0.92 g/cm$^3$. Suitable let-down LLDPE is commercially available, for instance, Petrothene®. GA602 LLDPE from Equistar Chemicals, LP.

The adhesive composition of the invention optionally comprises a polyolefin elastomer. Suitable polyolefin elastomers include ethylene-propylene rubber (EPR), ethylene-propylene-diene monomer rubber (EPDM), the like, and mixtures thereof. As used herein, the term "elastomer" refers to products having rubber-like properties and low crystallinity. Preferably, the polyolefin elastomers contain from 10 wt % up to 80 wt % ethylene monomeric units. More preferably, the polyolefin elastomers contain from 30 wt % to 80 wt % ethylene monomeric units. Illustrative polyolefin elastomers which are commercially available include Lanxess Corporation's BUNA® EP T 2070 (22 Mooney ML(1+4) 125° C., 68% ethylene, and 32% propylene); BUNA EP T 2370 (16 Mooney, 3% ethylidene norbornene, 72% ethylene, and 25% propylene); BUNA EP T 2460 (21 Mooney, 4% ethylidene norbornene, 62% ethylene, and 34% propylene); ExxonMobil Chemical's VISTALON® 707 (72% ethylene, 28% propylene, and 22.5 Mooney); VISTALON® 722 (72% ethylene, 28% propylene, and 16 Mooney); and VISTALON 828 (60% ethylene, 40% propylene, and 51 Mooney). Suitable EP elastomers available from commercial sources also include ExxonMobil Chemical's VISTAMAXX® series of elastomers, particularly VISTAMAXX grades 6100, 1100, and 3000. These materials are ethylene-propylene elastomers of 16, 15, and 11 wt % ethylene content, respectively, and a $T_g$ of -20 to -30° C. VISTAMAXX 6100, 1100, and 3000, respectively, have a melt flow rate of 3, 4, and 7 g/10 min at 230° C.; a density of 0.858, 0.862, and 0.871 g/cm$^3$; and a 200 g Vicat softening point of 48, 47, and 64° C. Other suitable EP elastomers include Dow Chemical's VERSIFY® elastomers, particularly grades DP3200.01, DP3300.01, and DP3400.01, which have an ethylene content of 9, 12, and 15 wt %, respectively. These grades have a melt flow rate of 8 g/10 min at 230° C.; a density of 0.876, 0.866, and 0.858 g/cm$^3$, respectively; a Vicat softening point of 60, 29, and <20° C., respectively; and a Tg of -25, -28, and -31° C., respectively.

Preferably, the adhesive composition of the invention comprises from 2 wt % to 30 wt % of maleated polyolefin, from 1 wt % to 30 wt % of polyolefin elastomer, and up to 97 wt % of LLDPE. More preferably, the adhesive composition comprises from 5 wt % to 15 wt % of maleated polyolefin, from 5 wt % to 25 wt % of polyolefin elastomer, and up to 90 wt % of LLDPE.

The adhesive composition of the invention optionally comprises additives such as antioxidants, UV-absorbents, flow agents, the like, and mixtures thereof. The polyolefin-based adhesive optionally comprises adhesion promoters. Useful promoters include organic bases, carboxylic acids and organometallic compounds including organic titanates and complexes or carboxylates of lead, cobalt, iron, nickel, zinc and tin such as dibutyltin dilaurate, dioctyltin maleate, dibutyltin diacetate, dibutyltin dioctoate, stannous acetate, stannous octoate, lead naphthenate, zinc caprylate, cobalt naphthenate, the like, and mixtures thereof.

The letting-down process can be performed in the same extruder as the maleating process. Alternatively, the maleating and the letting-down can be operated separately in the same or different plants and by the same or different manufacturers. Preferably, the let-down LLDPE is in a reactor powder form. More preferably, the letting-down is integrated into the LLDPE production process. That is, after the polymerization, the LLDPE is devolatilized to remove residual monomers and solvents from the reactor powder, and the reactor powder is then blended with the maleated polyolefin by extrusion and pelletized to form the product of the adhesive composition of the invention.

The process can be performed in a multistage extruder. Multistage extruders are known. For instance, U.S. Pat. Appl. Pub. No. 2006/0076705, the teachings of which are incorporated herein by reference, teaches a multistage extruder assembly. In the multistage extrusion process, the maleating is preferably performed with a free radical initiator. Suitable radical initiator includes 1,1-bis(tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butylcumylperoxide; α,α'-bis(tert-butylperoxyisopropyl)benzene; di-tert-butylperoxide; 2,5-dimethyl-2,5-di(tert-butylperoxy)hexane; the like, and mixtures thereof. The free radical initiator is preferably added to the extruder after maleic anhydride and the polyolefin have been thoroughly mixed. After the maleating reaction is essentially completed, the maleated polyolefin moves to the second stage of the extrusion where the let-down LLDPE is fed to the extruder and blended with the maleated polyolefin.

If a polyolefin rubber is used, the maleated polyolefin is preferably first blended with the polyolefin elastomer; and the resultant mixture is then blended with the LLDPE.

The invention includes a multilayer polyolefin film which comprises a tie-layer comprising the adhesive composition of the invention. By multilayer, we mean that the film has at least two more layers besides the tie layer. The tie layer bonds the other layers together. One example of multilayer film is a five-layer film which has the structure of HDPE/tie/EVOH/tie/HDPE. Ethylene-vinyl alcohol copolymer (EVOH) layer is employed as a barrier to oxygen. Another example of multilayer film is a seven-layer film which has the structure of LLDPE/HDPE/tie/EVOH/tie/HDPE/LLDPE. Suitable LLDPE and HDPE for use in the multilayer films are the same as discussed above. The multilayer film of the invention can be made by a variety of processes. The multilayer film can be made by co-extrusion, coating, and other laminating processes. The film can be made by casting, blown film, or double-bubble orientation processes. Blown film processes include high-stalk and in-pocket processes. In a high-stalk process, the extrudate exits the annular opening in the die in the form of a tubular stalk that is inflated a distance (usually the length of the stalk) from the extrusion die. For an in-pocket blown process, the tube is inflated as the tube exits the extrusion die. After the tube is flattened and cooled, it can be slit to form a film.

The invention also includes a multilayer pipe which comprises a tie layer comprising the adhesive composition of the invention. Suitable pipes include polymer-metal multilayer pipes and polymer-polymer multilayer pipes. Preferably, the multilayer pipe comprises five layers generally represented as polyolefin/tie/metal/tie/polyolefin. Pipe constructions of this type can be used for a wide variety of applications including heating and plumbing, for example, hot and cold potable water installations, radiant floor heating systems, snow and ice melting systems for walks and driveways, compressed air supply lines, radiator connections and industrial and sanitary applications. For pressure pipe constructions, the metal preferably is aluminum and the polyolefin preferably is PE. One example of five-layer construction is PE/tie/aluminum/tie/PE. PE can be optionally cross-linked, utilizing known technology such as thermal, moisture or irradiated cure processes, to enhance physical properties, particularly high temperature and high pressure resistance.

The following examples merely illustrate the invention. Those skilled in the art will recognize many variations that are within the spirit of the invention and scope of the claims.

Example 1

(A) Preparation of Adhesive Compositions

Ten parts by weight of a maleated HDPE (maleic anhydride 1.9 wt % and MI$_2$ 9.6 dg/min), 0.05 part by weight of Irganox® 1010 (antioxidant, product of Ciba Chemical), 0.05 part by weight of Irgafos® 168 (antioxidant, product of Ciba Chemical), and 89.9 parts by weight of various LLDPE resins given in Table 1 are blended using a ZSK-30 twin screw extruder at 250 RPM of screw speed and at a temperature of 220° C.

In Table 1, Ex. 1 (a) and (b) are examples of the adhesives of the invention and C. Ex. 1 (c) through C. Ex. C1 (f) are comparative adhesive examples. In Ex. 1(a) and (b), the LLDPE resins have a TREF soluble fraction 19.7 wt % and 19.8 wt %, respectively. The TREF soluble fraction is measured by dissolving the LLDPE samples in ODCB (orthodichlorobenzene) and injecting the solution onto a TREF column (20 microns, PL20, product of Polymer Labs) of an automated 3D-TREF system at 150° C. (temperature of column compartment). The 3D-TREF system is Waters GPCV 2000 with a built-in online Vistotex viscometer for measuring intrinsic viscosity. The injection volume is 1 mL; flow rate is 0.5 mL/min; sample concentration is about 2 mg/mL. The soluble fraction is measured from the peak area of TREF curves below 45° C. The intrinsic viscosity of the soluble fraction is measured by the built-in viscometer at 150° C. in ODCB. Intrinsic viscosity is an indication of the molecular weight of the soluble fraction. The intrinsic viscosities of Ex. 1(a) and (b) are 0.63 dl/g and 0.64 dl/g, respectively. The TREF soluble fractions and the intrinsic viscosities of Ex. 1(a) and 1(b) are within the scope of the invention, whereas either the soluble fraction or the intrinsic viscosity of Comparative Examples C. Ex. 1 (c) through C. Ex. C1 (f) falls outside such scope.

(B) Preparation of Multilayer Films

Five-layer films, in which the above adhesives are used as a tie-adhesive layer, are made on a Killion® extruder with the structure of HDPE/tie/EVOH/tie/HDPE. HDPE is Alathon® M6210, product of Equistar Chemicals, LP, which has an MI$_2$ of 0.95 dg/min and density of 0.958 g/cm$^3$. EVOH is Soarnol® DC3203 FB grade, product of Nippon Gohsei Kagaku K.K., Japan. The layer distribution is 42%, 4%, 8%, 4%, and 42% respectively. Film samples are tested for adhesion according to ASTM D1876. The force required to separate the film apart in a T-Peel configuration at 25.4 mm (10")/min is measured using Instron® tensile tester. The average adhesion of five specimens is recorded as the peel strength in lb/in. Films having 3 mils and 5 mils of total thickness are tested. The results are recorded in Table 1, which indicate that the adhesives of the invention give better adhesion than the comparatives.

Example 2

(A) Preparation of Adhesive Compositions

The general procedure of Example 1, step A is followed. Fourteen parts by weight of a maleated HDPE (MA 1.9 wt % and MI$_2$ 9.6 dg/min), 25 parts by weight of ethylene-propylene rubber (EPR, Vistalon® V722, product of Exxon Chemical, MI$_2$: 1.0 dg/min, ethylene content: 72 wt %), 0.1 part by weight of Irganox 1010, 0.05 part by weight of Irgafos 168, 0.1 part by weight of Irganox 1330® (antioxidant, product of Ciba Chemical), and 60.75 parts by weight of LLDPE which is used in Ex. 1(a) are blended using a ZSK-30 twin screw extruder at 250 RPM of screw speed and at a temperature of 220° C. The resultant adhesive is evaluated in multilayer pipe as follows.

(B) Multilayer Pipe Evaluation

The target application is a multilayer pipe where the above-prepared adhesive is used in a structure of PEX/tie/aluminum/tie/PEX, where PEX is cross-linked HDPE. A simulated ring peel test procedure is developed to simulate the adhesion performance of tie layers to aluminum. In this test, a three-layer structure aluminum(200 micron)/tie(250 micron)/aluminum(200 micron) is constructed by compression molding at 216° C. and 20-ton pressure for 5 minutes. The three-layer structure is then cooled to room temperature and cut to 1-cm wide samples. Samples are wrapped around a 12 mm rod to form a ring. Samples are conditioned at 60° C. inside an Instron tensile tester with controlled heated chamber. The samples are then separated at the tie/aluminum interface at 60° C. The force required for separating the adhesive from aluminum in a ring configuration at 25.4 mm (10")/min is measured and recorded as adhesion. The average adhesion of five specimens is 53.5 lb/in.

TABLE 1

RESULTS SUMMARY

| Ex. No. | MI$_2$ (dg/min) | Density (g/cm$^3$) | TREF Soluble Fraction (wt %) | Intrinsic Viscosity of Soluble Fraction (dl/g) | Adhesion of 3-mil films (lb/in) | Adhesion of 5-mil films (lb/in) |
|---|---|---|---|---|---|---|
| Ex. 1(a) | 1 | 0.919 | 19.7 | 0.6 | 1.2 | 2.4 |
| Ex. 1(b) | 2 | 0.918 | 19.8 | 0.6 | 1.3 | 2.3 |
| C. Ex. 1(c) | 1 | 0.918 | 8.8 | 1.6 | 0.6 | 1.3 |
| C. Ex. 1(d) | 2 | 0.918 | 10.0 | 1.3 | 0.8 | 1.4 |

TABLE 1-continued

RESULTS SUMMARY

| Ex. No. | MI$_2$ (dg/min) | Density (g/cm$^3$) | TREF Soluble Fraction (wt %) | Intrinsic Viscosity of Soluble Fraction (dl/g) | Adhesion of 3-mil films (lb/in) | Adhesion of 5-mil films (lb/in) |
|---|---|---|---|---|---|---|
| C. Ex. 1(e) | 2 | 0.918 | 15.0 | 0.9 | 0.7 | 1.4 |
| C. Ex. 1(f) | 1 | 0.916 | 20.4 | 1.1 | 1.1 | 2.2 |

We claim:

1. An adhesive composition comprising:
   (i) 2 to 30 wt. %, based upon the total weight of the adhesive composition, of a maleated polyolefin; and
   (ii) a linear low density polyethylene (LLDPE), wherein the LLDPE comprises;
   greater than 15 to less than 20 wt. %, based upon the total weight of the LLDPE, of a TREF soluble fraction in ortho-dichlorobenzene, wherein the TREF soluble fraction has an intrinsic viscosity of greater than 0.3 to less than 0.7 dl/g as measured in ortho-dichlorobenzene at 150° C., and wherein the LLDPE has a melt index MI$_2$ from 0.1 dg/in to 3 dg/min
   wherein the TREF soluble fraction is measured from the peak area of the TREF curve below 45° C.

2. The composition of claim 1, wherein the maleated polyolefin is a maleated high density polyethylene (HDPE).

3. The composition of claim 2, the maleated HDPE has a grafted maleic anhydride content within the range of 0.5 wt % to 3.5 wt %.

4. The composition of claim 1, which further comprises a polyolefin elastomer.

5. The composition of claim 4, wherein the polyolefin elastomer is an ethylene-propylene rubber.

6. A multilayer film comprising a layer of the adhesive of claim 1.

7. A multilayer pipe comprising a layer of the adhesive of claim 1.

8. The composition of claim 1, wherein the TREF soluble fraction has an intrinsic viscosity of about 0.6 dl/g.

9. A process for producing a polyolefin-based adhesive, comprising:
   (i) blending 2 to 30 wt. %, based upon the total weight of the adhesive composition, of a maleated polyolefin; and
   (ii) a linear low density polyethylene (LLDPE), wherein the LLDPE comprises:
   greater than 15 to less than 20 wt.%, based upon the total weight of the LLDPE, of a TREF soluble fraction in ortho-dichlorobenzene, wherein the TREF soluble fraction has an intrinsic viscosity greater than 0.3 to less than 0.7 dl/g as measured in ortho-dichlorobenzene at 150° C., and wherein the LLDPE has a melt index MI$_2$ from 0.1 dg/min to 3 dg/min
   wherein the TREF soluble fraction is measured from the peak area of the TREF curve below 45° C.

10. The process of claim 9, wherein the LLDPE is a reactor powder.

11. The process of claim 9, the maleated polyolefin has a maleic anhydride content within the range of 0.5 wt % to 3.5 wt %.

12. The process of claim 9, wherein the TREF soluble fraction has an intrinsic viscosity of about 0.6 dl/g.

13. The process of claim 9, wherein the maleated polyethylene is an maleated high density polyethylene (HDPE).

* * * * *